(12) United States Patent
Jadidian et al.

(10) Patent No.: US 12,078,811 B1
(45) Date of Patent: Sep. 3, 2024

(54) CUSTOMIZED FACE TRACKING SYSTEMS AND METHODS

(71) Applicant: Microsoft Technology Licensing, LLC, Redmond, WA (US)

(72) Inventors: Jouya Jadidian, Los Gatos, CA (US); Gabriele D'Amone, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/169,110

(22) Filed: Feb. 14, 2023

(51) Int. Cl.
*G02B 27/00* (2006.01)
*G02B 27/01* (2006.01)
*G06V 10/141* (2022.01)

(52) U.S. Cl.
CPC ..... *G02B 27/0176* (2013.01); *G02B 27/0093* (2013.01); *G02B 27/0101* (2013.01); *G06V 10/141* (2022.01); *G02B 2027/0138* (2013.01)

(58) Field of Classification Search
CPC ............ G02B 27/0176; G02B 27/0093; G02B 27/0101; G02B 2027/0138; G06V 10/141
See application file for complete search history.

(56) References Cited

U.S. PATENT DOCUMENTS

| 10,663,739 | B1 | 5/2020 | Drinkwater | |
| 2014/0309619 | A1* | 10/2014 | Agarwal | A61M 5/158 604/173 |
| 2019/0076254 | A1* | 3/2019 | Essayed | A61F 2/2875 |
| 2021/0353973 | A1* | 11/2021 | Bhat | A62B 18/025 |
| 2022/0187609 | A1* | 6/2022 | Snyder | H04R 1/1066 |

FOREIGN PATENT DOCUMENTS

| WO | 2014082023 A1 | 5/2014 |
| WO | 2022261217 A1 | 12/2022 |

OTHER PUBLICATIONS

International Search Report and Written Opinion received for PCT Application No. PCT/US2024/014907, May 24, 2024, 13 pages.

* cited by examiner

*Primary Examiner* — Robert J Michaud
(74) *Attorney, Agent, or Firm* — Workman Nydegger (57) ABSTRACT

A head mounted device includes a base gasket and a custom gasket rim that is selectively connectable to and disconnectable from the base gasket. The custom gasket rim is configured to intervene between the base gasket and a face of a user.

19 Claims, 11 Drawing Sheets

System 100

CUSTOMIZED FACE TRACKING SYSTEMS AND METHODS

BACKGROUND

Mixed-reality (MR) systems, including virtual-reality and augmented reality systems, have received significant attention because of their ability to create unique experiences for their users. For reference, conventional virtual-reality (VR) systems create a completely immersive experience by restricting their users' views to only a virtual environment. This is often achieved, in VR systems, through the use of a head-mounted display (HMD) that completely blocks any view of the real world. As a result, a user is entirely immersed within the virtual environment. In contrast, conventional augmented-reality (AR) systems create an augmented-reality experience by visually presenting virtual objects (via an HMD) that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

To facilitate MR experiences, many HMDs include various sensors that are used to track facial features of the user. For example, many HMDs include camera sensors that are used to capture imagery of the user's eyes, mouth movements, and/or other facial features (e.g., under active infrared illumination). The captured imagery may be processed to determine gaze direction, focal distance, facial configuration and/or other information usable for presenting realistic MR experiences.

The subject matter claimed herein is not limited to embodiments that operate only in environments such as those described above. Rather, this background is only provided to illustrate one example technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Disclosed embodiments are generally directed to customized face tracking systems, methods, and apparatuses.

As noted above, many HMDs include image sensors for capturing sensor data usable to facilitate MR experiences. However, the applicability of image sensors for tracking various portions of a user's face is limited by occlusion. For instance, HMDs often cover significant portions of the user's face, rendering HMD-mounted cameras unable to detect such portions of the user's face. As a result, existing image-based face tracking systems are unable to obtain wholistic representations of user facial expressions. Such limitations hinder the ability of existing systems to facilitate realistic social interactions in MR environments (e.g., by capturing wholistic user facial expressions and causing a virtual avatar to simulate such expressions).

At least some disclosed embodiments implement a sensor array (e.g., an array of low-power electrodes) in the face gasket of an HMD. The sensor array can be used to capture facial configurations of portions of user faces that are occluded by the HMD face gasket, enabling systems to provide accurate face tracking functionality (e.g., in combination with image-based face tracking systems).

Many HMDs include face gaskets that are only available in discrete, predefined size configurations (e.g., small, medium, large). Such limited options can cause degraded user experiences for users with face shapes that do not sufficiently conform to the predefined size configurations. For instance, users may experience discomfort from ill-fitting hardware and/or may experience degraded VR experiences because of a face gasket's inability to block ambient light (in view of non-conformance of the face gasket to the user's face).

At least some disclosed embodiments include custom face gasket rims that may be connected to base gaskets of HMDs. In some instances, custom gasket rims are generated based on a video-based 3D scan of a user's face (e.g., carried out through a user application). A support structure may be formed based on the 3D scan, and a photopolymer material may be placed over the support structure. While positioned over the support structure, the photopolymer material may be subjected to illumination or other processing to cause curing and/or hardening of the photopolymer material to form a custom face gasket rim.

In some implementations, a sensor array may be positioned between a custom gasket rim and a base gasket of an HMD, thereby allowing the sensor array to be arranged in different positional configurations for different users. The combination of a base gasket, custom gasket rim, and an embedded sensor array may facilitate improved user comfort, high-resolution and/or wholistic face tracking, and/or improved peripheral light sealing for MR HMDs.

Although the present disclosure focuses, in at least some respects, on examples in which aspects of custom face gaskets are implemented on HMDs (e.g., MR HMDs, night vision goggles, or other actively powered headsets), at least some of the principles described herein may be implemented on other types of head-mounted devices (e.g., passive head mounted devices, such as goggles).

Having just described some of the various high-level features and benefits associated with the disclosed embodiments, attention will now be directed to FIGS. 1 through 11 These Figures illustrate various conceptual representations, architectures, methods, and supporting illustrations related to the disclosed embodiments.

Example Systems and Components

Figure 1:
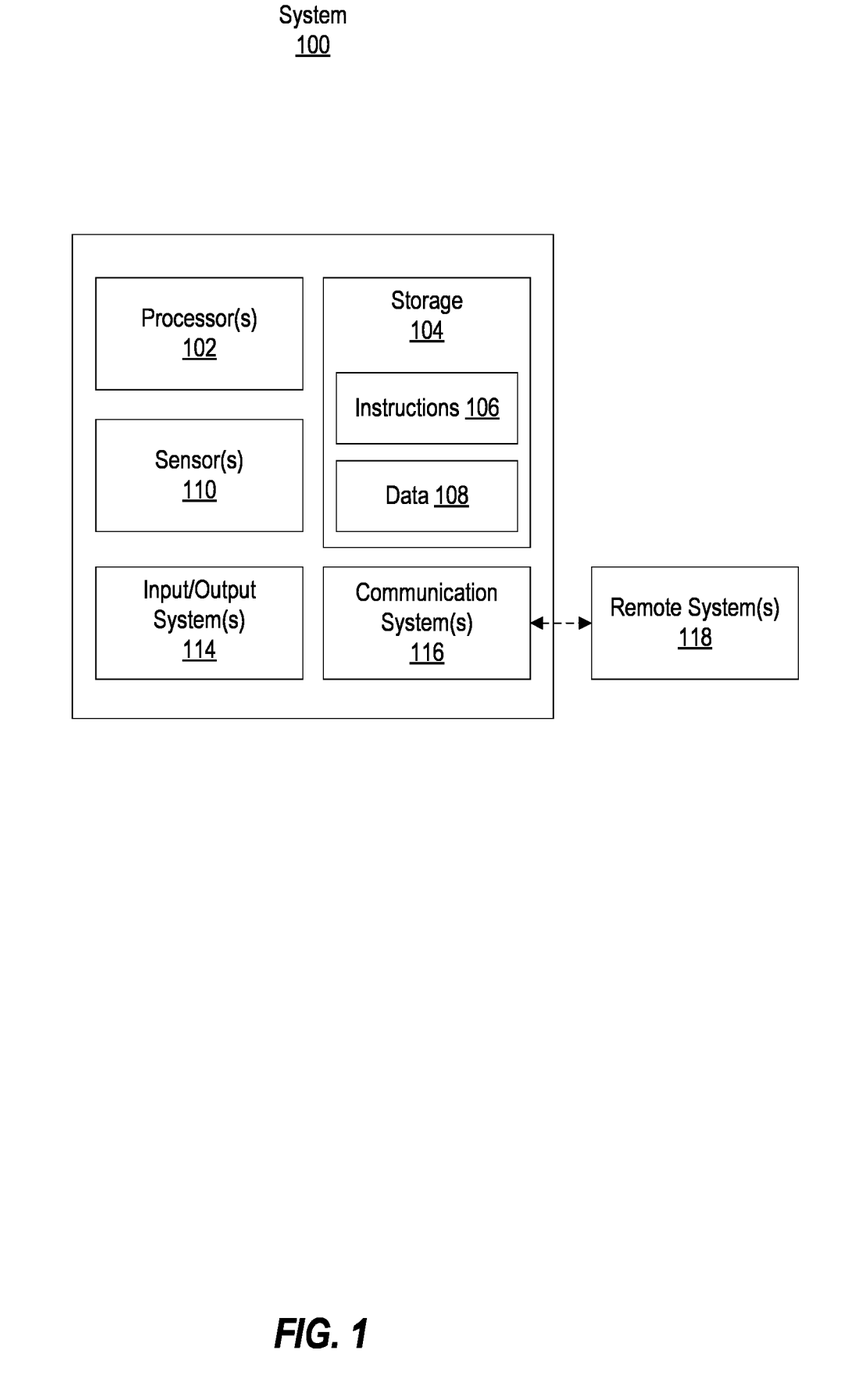
FIG. 1 illustrates example components of an example system that may include or be used to implement one or more disclosed embodiments.

FIG. 1 illustrates various example components of a system 100 that may be used to implement one or more disclosed embodiments. For example, FIG. 1 illustrates that a system 100 may include processor(s) 102, storage 104, sensor(s) 110, input/output system(s) 114 (I/O system(s) 114), and communication system(s) 116. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions. The actions may rely at least in part on data 108 stored on storage 104 in a volatile or non-volatile manner.

In some instances, the actions may rely at least in part on communication system(s) 116 for receiving data from remote system(s) 118, which may include, for example, separate systems or computing devices, sensors, and/or others. The communications system(s) 116 may comprise any combination of software or hardware components that are operable to facilitate communication between on-system components/devices and/or with off-system components/devices. For example, the communications system(s) 116 may comprise ports, buses, or other physical connection apparatuses for communicating with other devices/components. Additionally, or alternatively, the communications system(s) 116 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable or detectable phenomenon. By way of non-limiting example, the sensor(s) 110 may comprise one or more radar sensors, image sensors, microphones, thermometers, barometers, magnetometers, accelerometers, gyroscopes, and/or others.

Furthermore, FIG. 1 illustrates that a system 100 may comprise or be in communication with I/O system(s) 114. I/O system(s) 114 may include any type of input or output device such as, by way of non-limiting example, a touch screen, a mouse, a keyboard, a controller, and/or others, without limitation. For example, the I/O system(s) 114 may include a display system that may comprise any number of display panels, optics, laser scanning display assemblies, and/or other components.

At least some components of the system 100 may comprise or utilize various types of devices, such as mobile electronic devices (e.g., smartphones), personal computing devices (e.g., a laptops), wearable devices (e.g., smartwatches, HMDs, etc.), vehicles (e.g., aerial vehicles, autonomous vehicles, etc.), and/or other devices. A system 100 may take on other forms in accordance with the present disclosure.

Customized Face Tracking Systems and Components

Figure 2:
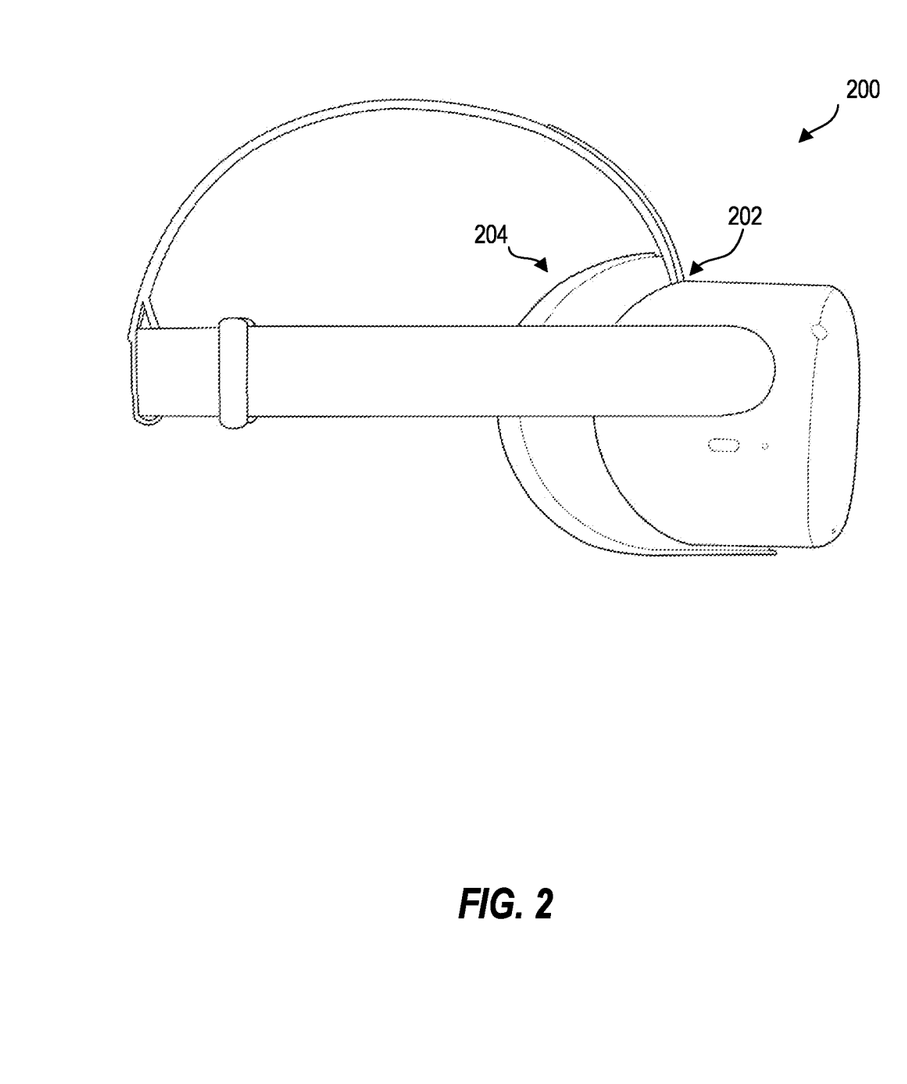
FIG. 2 depicts an example HMD.

FIG. 2 depicts an example HMD 200. As shown in FIG. 2, the example HMD 200 includes an HMD chassis 202 or frame that houses and/or supports various components of the HMD 200. The HMD 200 of FIG. 2 furthermore includes a gasket assembly 204, which is connected to the HMD chassis 202. As will be described in more detail hereinbelow, may include one or more components that are customizable to conform to user facial features.

Figure 3:
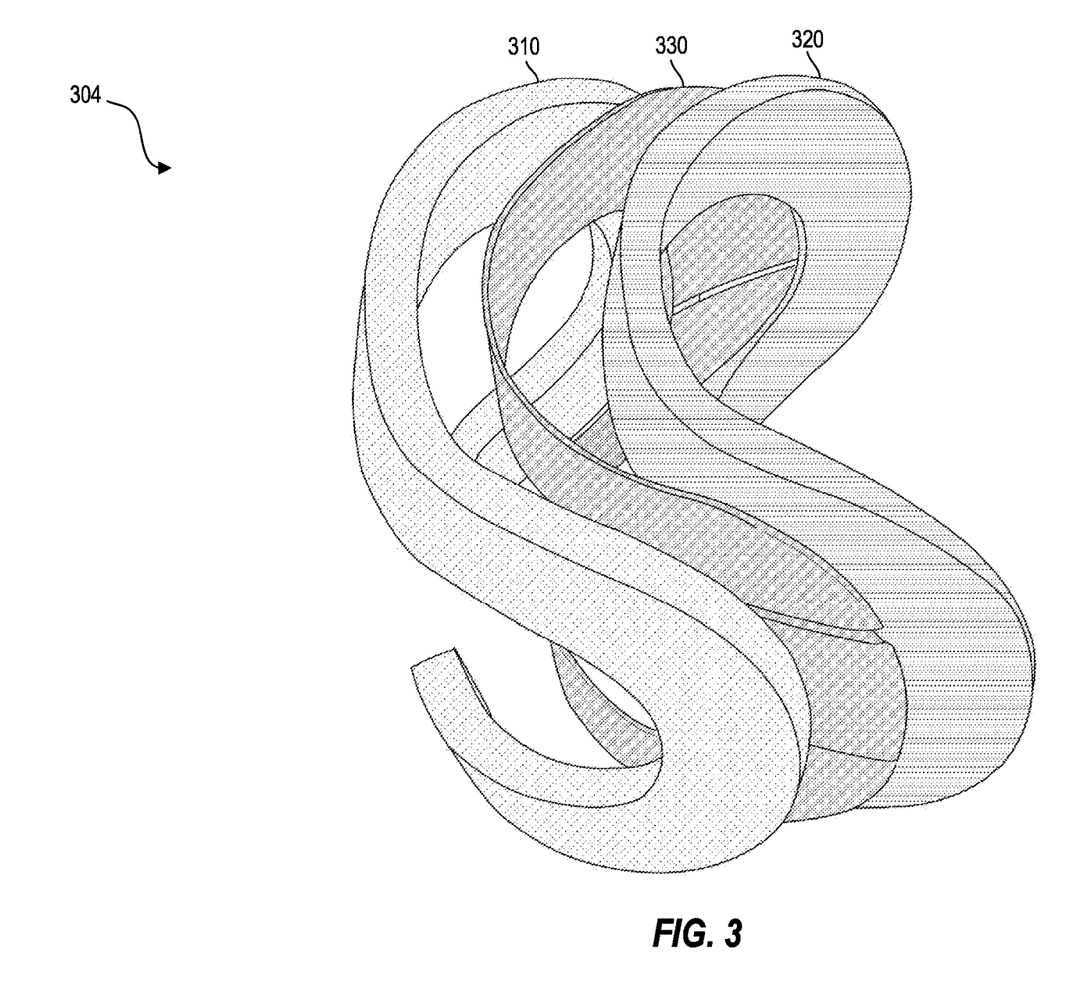
FIG. 3 depicts an example gasket assembly of an HMD that includes a base gasket, custom gasket rim, and a sensor array.

FIG. 3 illustrates various aspects of a gasket assembly 304 (which may correspond to the gasket assembly 204 of the HMD 200 of FIG. 2). In the example of FIG. 3, the gasket assembly 304 includes a base gasket 310, a custom gasket rim 320, sensor array 330 (illustrated in disassembled form in the example of FIG. 3). In some implementations, the base gasket 310 is fixed to a chassis of a head-mounted device (e.g., the HMD chassis 202 of the HMD 200 of FIG. 2).

The base gasket 310 may comprise a component of the gasket assembly 304 that is not customized for particular users (e.g., a component of the gasket assembly 304 that is not unique to particular users). For instance, for a particular type of head-mounted device product (e.g., associated with a particular uniform product code (UPC)), the base gasket 310 may have a predefined size (e.g., selected from a plurality of predefined sizes, such as small, medium, and large) that is not specifically tailored to conform to facial features of any particular user.

The custom gasket rim 320 of the example gasket assembly 304 is configured to intervene between the base gasket 310 and the face of the user operating the head mounted device with which the gasket assembly 304 is associated (e.g., HMD 200). The custom gasket rim 320 may be customized in size and/or shape to conform to or fit to facial characteristics/features of an individual user (or population of users; a population of users may be defined based on various factors, such as age, sex, genetic makeup, geographic area, ethnicity, race, gender identity, weight, height, and/or others).

As will be described in more detail hereinafter, a custom gasket rim 320 may be formed for an individual user (or a population of users) based upon face scan data associated with an individual user (or multiple individual users). In some instances, a custom gasket rim 320 is formed (at least in part) from a photopolymer material, which may be shaped based on face scan data and cured/hardened via an illumination process (or heating or other process). In some implementations, the curing and/or hardening of a photopolymer material to form a custom gasket rim 320 is performed to provide customized and/or variable rigidity throughout the custom gasket rim 320 (e.g., enabling different regions of the custom gasket rim 320 to have different rigidity characteristics).

Figure 4:
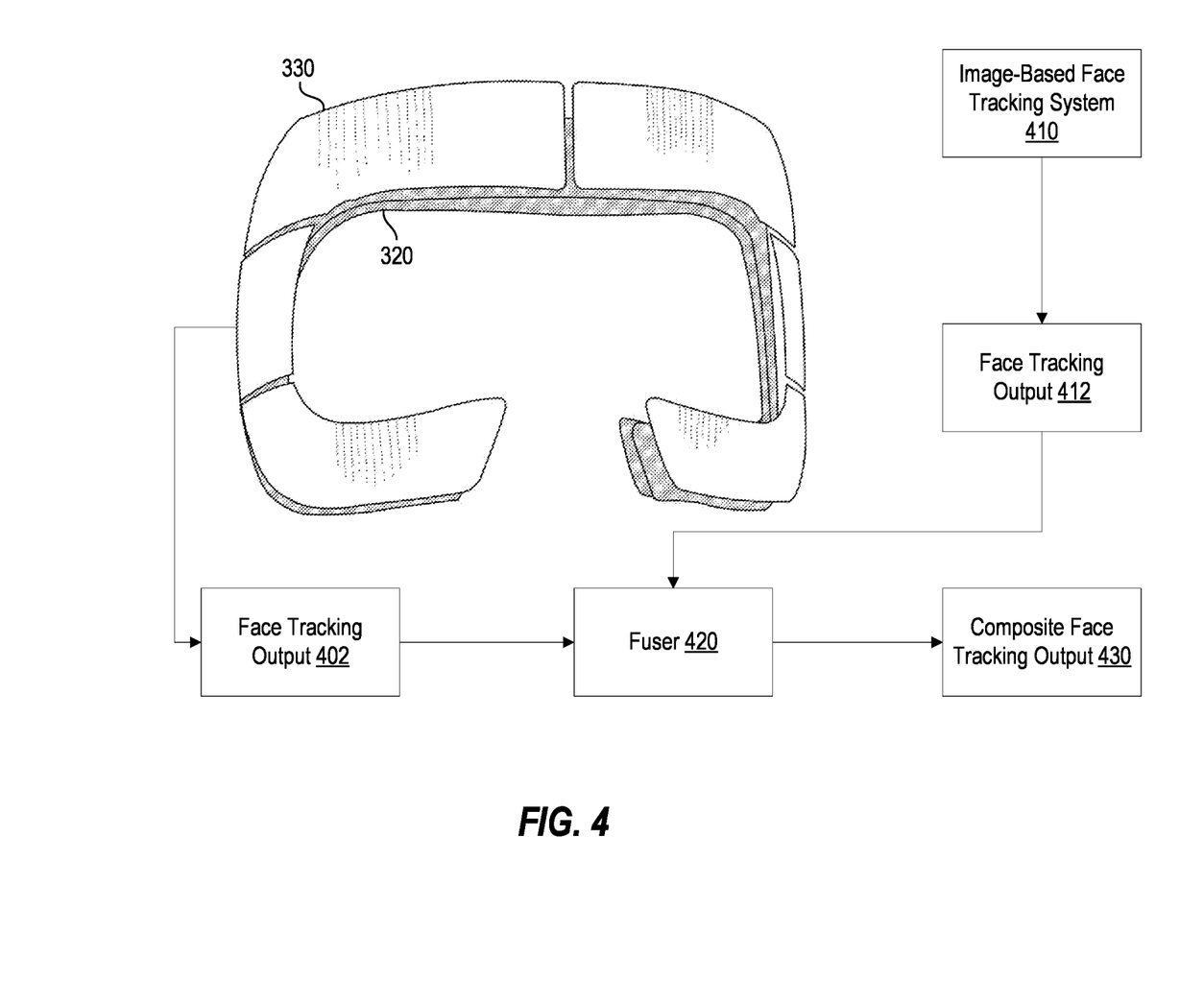
FIG. 4 provides a conceptual representation of operation of a sensor array of a gasket assembly of an HMD.

In some implementations, the custom gasket rim 320 of the example gasket assembly 304 of FIG. 4 is selectively connectable to (and disconnectable from) the base gasket 310. Various selective connection mechanisms are within the scope of the present disclosure, such as magnetic connection systems (with corresponding magnet components arranged on the custom gasket rim 320 and the base gasket 310), hook and loop systems, detent/protrusion systems, and/or any system of interlocking or interconnecting features.

The functionality of selective connection between custom gasket rims 320 and base gaskets 310 of head mounted devices may enable a single head mounted device to be usable by multiple users (in turn), while still achieving custom conformance to the facial features of the multiple users. For example, a single HMD (or a few HMDs) may be utilized by a household with multiple individual users. Each individual user may have their own custom gasket rim 320 customized to their own respective facial features. Each individual user may thus selectively connect their own custom gasket rim 320 to the base gasket 310 of the shared HMD prior to use of the shared HMD (and may selectively disconnect their custom gasket rim 320 from the shared HMD after use, enabling the next user to connect their own custom gasket rim 320 to the shared HMD).

In some instances, the custom gasket rim 320 has a predetermined base size (e.g., corresponding to a predetermined size of the base gasket 310 so as to enable alignment between connection features of the custom gasket rim 320 and the base gasket 310). In some instances, multiple custom gasket rims may be associated with a single user (e.g., each associated with a different predetermined base size), which the user may use when operating different HMDs (e.g., HMDs with differently sized base gaskets).

Additional details and examples related to forming custom gasket rims 320 will be provided hereinafter.

The sensor array 330 of the example gasket assembly 304 of FIG. 3 is configured to interface with the base gasket 310 and/or the custom gasket rim 320. For instance, in the example of FIG. 3, the sensor array 330 is configured to intervene between (or be sandwiched between) the base gasket 310 and the custom gasket rim 320. The sensor array 330 may abut or be connected or connectable to the base gasket 310 and/or the custom gasket rim 320. For instance, the sensor array 330 may be fixedly attached to or embedded into the base gasket 310 and selectively connectable to the custom gasket rim 320. As another example, the sensor array 330 may be fixedly attached to or embedded into the custom gasket rim 320 (e.g., after or as part of forming the custom gasket rim 320, as will be described in more detail hereinafter) and selectively connectable to the base gasket 310. In some implementations, the sensor array 330 is at least partially customized to conform to an individual user (or a population of users). Such customization may be achieved utilizing face scan data, as discussed herein.

In some instances, the sensor array 330 may include connection features for facilitating selective connection between the base gasket 310 and the custom gasket rim 320 (e.g., the sensor array 330 may include connection features for interconnecting with corresponding connection features of the base gasket 310 or the custom gasket rim 320).

The sensor array 330 of the example gasket assembly 304 of FIG. 3 is configured to facilitate tracking of facial features that abut the custom gasket rim 320. For instance, displacement of a user's facial features (e.g., brought about by the user changing facial expressions) may cause displacement of part of the custom gasket rim 320 and, in turn, displacement of a corresponding part of the sensor array 330. The sensor array 330 may detect such displacements in order to accurately track aspects of user facial configurations and/or expressions (e.g., aspects that would be occluded from image-based face tracking systems).

To facilitate such face tracking functionality, the sensor array 330 may comprise various types of at least partially deformable materials, such as copper or silver nanowire structures, multilayer structures, etc. The sensor array 330 may be configured to detect signals emitted by a transmitter system of the head mounted device to which the gasket assembly 304 is attached, and the detected signals may be utilized to obtain face tracking information. In one example, the sensor array 330 takes the form of a radiofrequency (RF) antenna array that is configured to detect radio signals emitted by a transmitter system of a head mounted device. The sensor array 330 may thus advantageously be implemented as a low power (or potentially completely passive) system. The sensor array 330 may be connected to a head mounted device via circuitry that is not affected by the shape of the sensor array 330 and/or the custom gasket rim 320 to which the sensor array 330 is connected. The sensor array 330 may include any number of discrete sensor components (e.g., antennas, which may include separate circuitry for connecting to the head mounted device) that operate in concert to facilitate face tracking.

FIG. 4 provides a conceptual representation of operation of the sensor array 330 of the gasket assembly 304 (the base gasket 310 is not depicted in FIG. 4). FIG. 4 indicates that the sensory array 330 may be operated to facilitate acquisition of face tracking output 402 (as indicated in FIG. 4 by the arrow extending from the sensor array 330 to the face tracking output 402). The face tracking output 402 may provide positional and/or motion information for facial features of a user that abut the custom gasket rim 320 that is connected to the sensor array 330. Such face tracking output 402 may additionally or alternatively be utilized to infer positional and/or motion information for facial features that do not directly abut the custom gasket rim 320.

FIG. 4 also conceptually depicts an image-based face tracking system 410, which may comprise sensor(s) 110 of a system 100 (e.g., HMD 200) to which the sensor array 330 is connected. The image-based face tracking system 410 may be operated to facilitate acquisition of face tracking output 412 (as indicated in FIG. 4 by the arrow extending from the image-based face tracking system 410 to the face tracking output 412).

In some instances, the face tracking output 402 and the face tracking output 412 may be utilized in combination to facilitate face tracking. For instance, FIG. 4 depicts the face tracking output 402 being fused with the face tracking output 412 via a fuser 420 to obtain composite face tracking output 430 (e.g., representative of a user's entire facial expression, including the portions that would be occluded under traditional image-based face tracking techniques).

Figure 5:
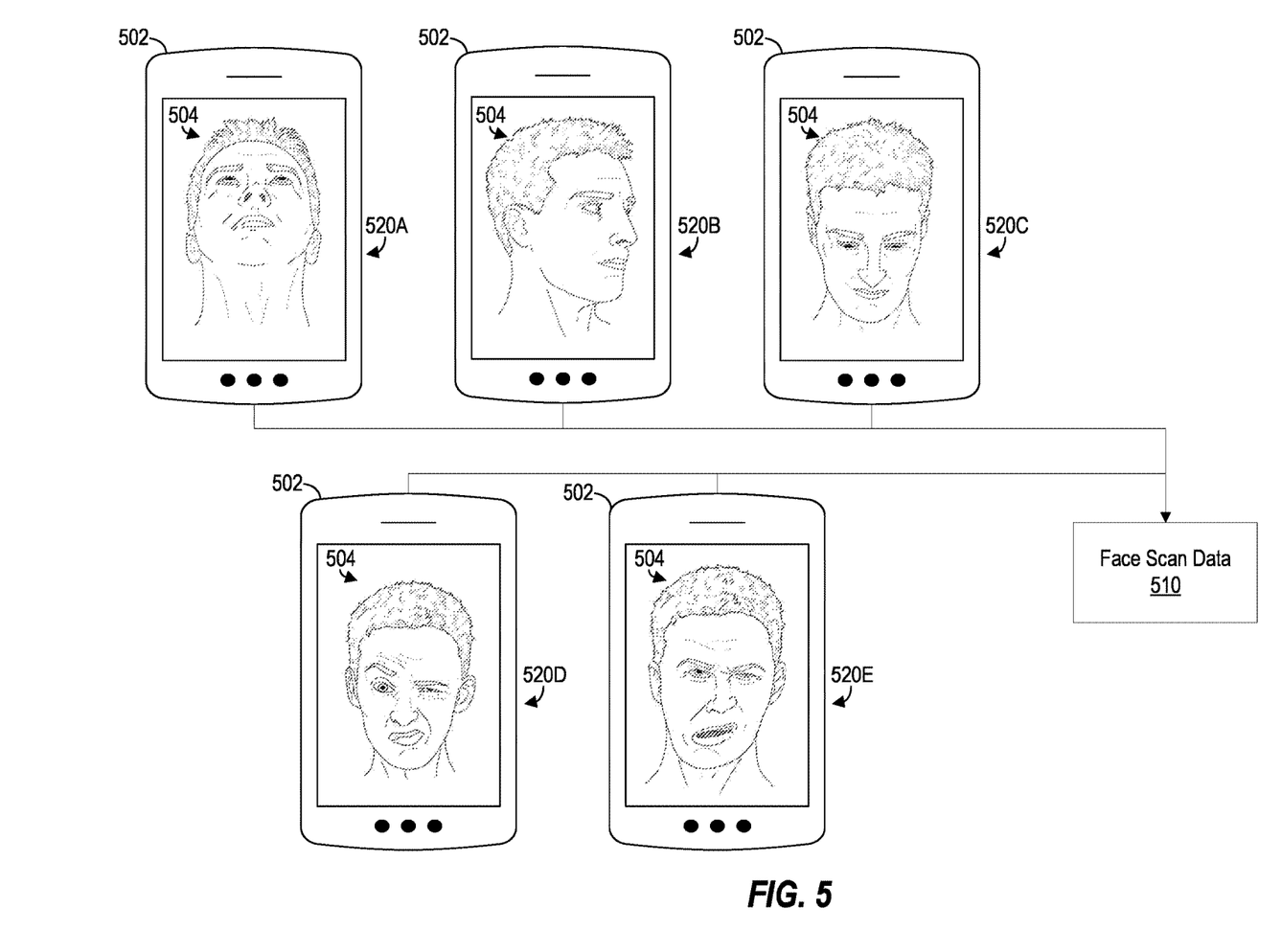
FIG. 5 provides a conceptual representation of acquisition of face scan data for a user.

As noted hereinabove, the custom gasket rim 320 (and/or the sensor array 330) may be formed based upon face scan data. FIG. 5 provides a conceptual representation of acquisition of face scan data for a user. In particular, FIG. 5 illustrates a user device 502 at different instances of time (e.g., instances 520A-520E) during acquisition of face scan data 510 for a user 504. The face scan data 510 may comprise one or more 3D models of the face of the user 504 based upon image or video data obtained as the user 504 moves their head to different positions (as depicted in FIG. 5 by image acquisition instances 520A, 520B, and 520C). The face scan data 510 may additionally or alternatively capture displacement of facial features of the user 504. The displacement of the facial features of the user 504 may be measured for different facial expressions of the user 504 based upon image or video data obtained as the user 504 assumes different facial expressions (as depicted in FIG. 5 by image acquisition instances 520D and 520E).

The face scan data 510 may be utilized to determine various aspects of a gasket assembly (e.g., a base gasket, custom gasket rim, and/or sensor array). For instance, a 3D shape of a user face represented in the face scan data 510 may be utilized to select or recommend a predefined size for a base gasket for use by the user. As another example, the face scan data 510 may be utilized to select a base size of a custom gasket rim (and/or sensor array) that will be further customized to conform to the shape of the face of the user. As still another example, the face scan data 510 may be utilized to select a shape for a custom gasket rim (and/or support structure or other parameters for shaping the custom gasket rim). As yet another example, the face scan data 510 may be utilized to select rigidity characteristics of a custom gasket rim (and/or illumination, curing, or other processing parameters for achieving particular rigidity characteristics for the custom gasket rim). Such determinations and/or selections may be made in various ways, such as manually by a user and/or utilizing artificial intelligence (e.g., via an AI module configured to output rigidity characteristics (or associated illumination characteristics), sizes, support structure configurations, and/or other output based upon face scan data input).

As indicated above, face scan data 510 may be acquired for an individual user to facilitate formation of a custom gasket rim (and/or sensor array) customized for the individual user, and/or face scan data 510 may be acquired for multiple users to facilitate formation of population-level custom gasket rims (e.g., generally customized for individuals in the population).

Figure 6:
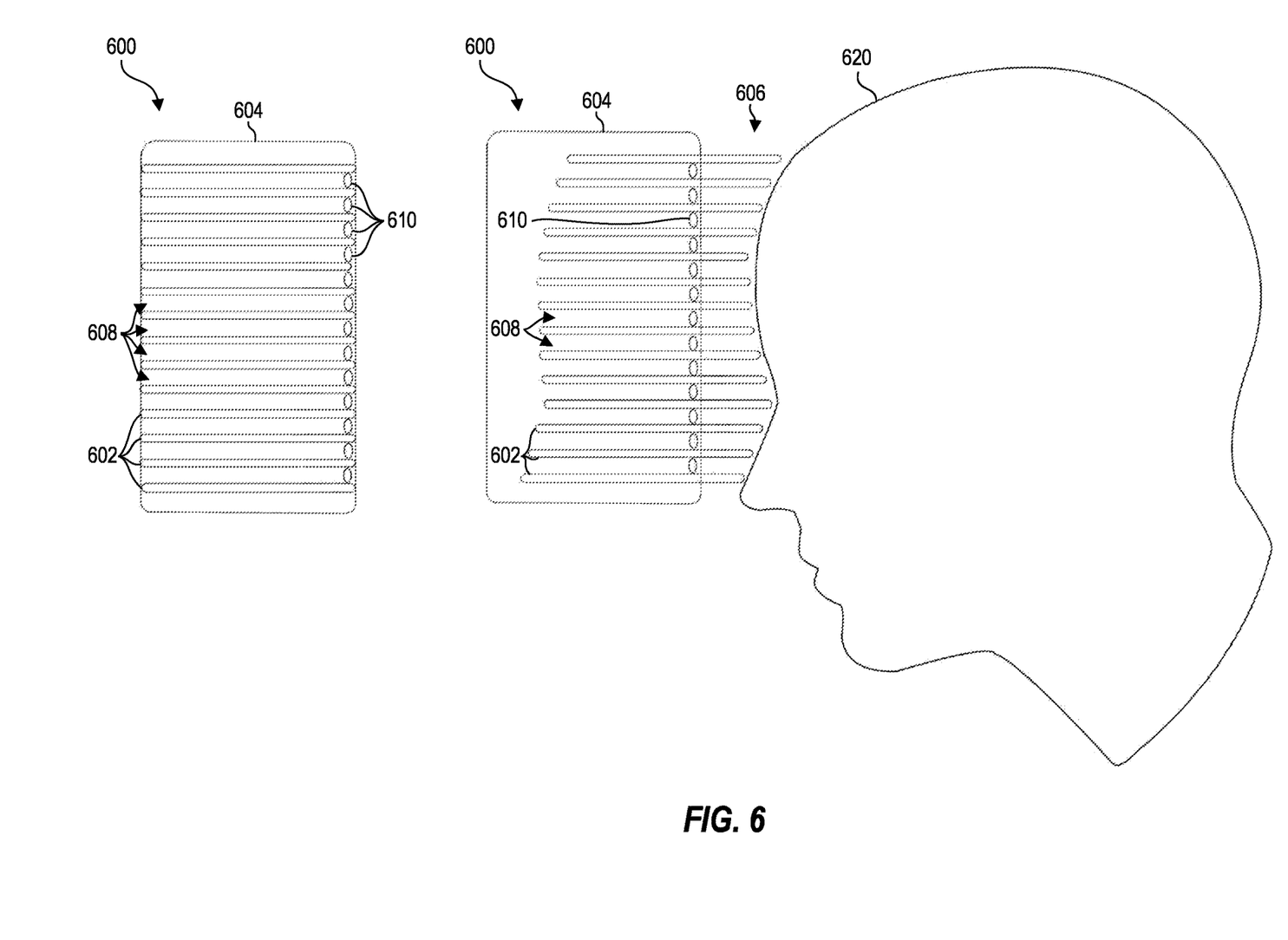
FIG. 6 illustrates a conceptual representation of positioning a support structure using face scan data.

FIG. 6 illustrates a conceptual representation of a device 600 configured for forming custom gasket rims, in accordance with implementations of the present disclosure. Aspects of the device 600 may be implemented in various contexts. For instance, a device 600 may be provided to users (e.g., accompanying shipments of head mounted devices) to allow users to form custom gasket rims at their leisure. As another example, a device 600 may be utilized in point of sale implementations (e.g., in physical stores), at manufacturer or fulfillment facilities, and/or in other contexts.

In the example of FIG. 6, the device 600 includes support members 602 that can be adjusted and/or reconfigured based upon a face shape 620 of a user. The left portion of FIG. 6 illustrates the device 600 with the support members 602 retracted, and the right portion of FIG. 6 illustrates the device 600 with the support members 602 extended. In some implementations, the support members 602 are configured to actuate and extend from a support member housing 604 to conform to the user face shape 620, thereby forming a support structure 606 on which material may be placed for forming a custom gasket rim for the face shape 620.

In some instances, the support members 602 divide the support structure 606 into different regions 608. For instance, the support members 602 may comprise walls that extend from the housing 604 to conform to the face shape 620 and that divide the support structure 606 into regions 608 formed by the space between adjacent walls. At least some of the different regions 608 may be associated with a respective illumination component 610 (e.g., a light emitting diode (LED)). In some implementations, the illumination components 610 are configured to illuminate a material positioned in conformity with the support structure 606 to form a custom gasket rim.

As indicated hereinabove, the face shape 620 may be represented in and/or based upon face scan data (e.g., an average face shape according to the face scan data 510). In some instances, the face shape 620 about which the support members 602 are extended comprises an actual physical face of a user (e.g., where the device 600 is positioned in proximity to a user's face to enable extension of the support members 602 into conformity with the user's face).

Figure 7:
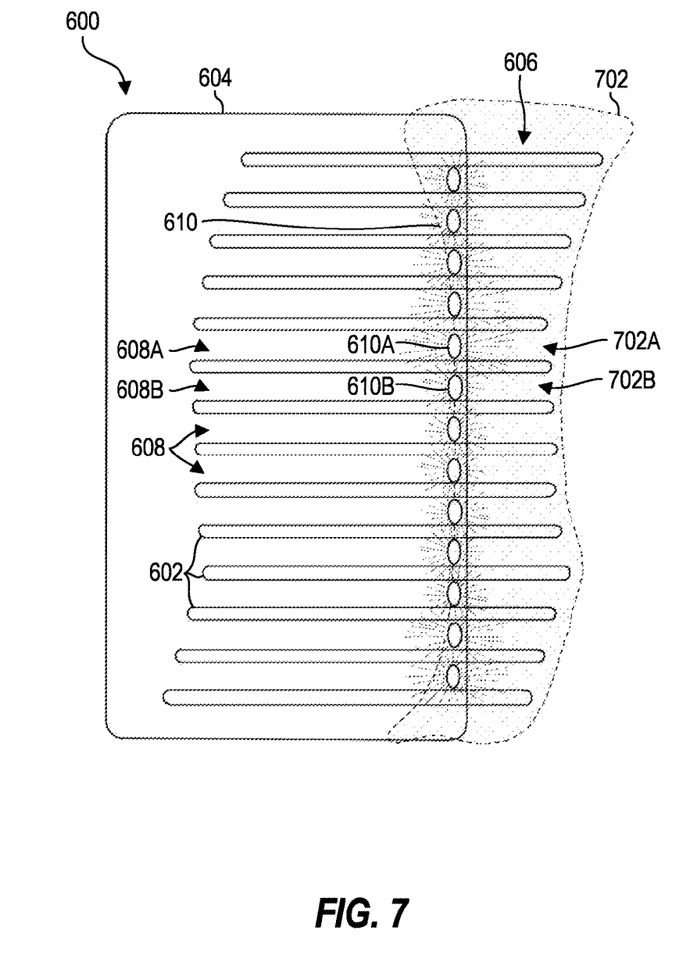
FIGS. 7 and 8 illustrate a conceptual representation of illuminating a photopolymer gasket rim positioned on the support structure to form a custom gasket rim.

FIG. 7 illustrates the device 600 of FIG. 6 with a photopolymer gasket rim 702 wrapped or pushed around the support structure 606 formed by the support members 602 extended from the housing 604 of the device 600. FIG. 7 also conceptually depicts illumination of the photopolymer gasket rim 702 by the illumination components 610 of the device 600 (as indicated in FIG. 7 by the dashed lines extending outward from the illumination components 610). Exposure of the photopolymer gasket rim 702 to light from the illumination components 610 may cause curing or hardening of the photopolymer gasket rim 702 to form a custom gasket rim (e.g., custom gasket rim 320 as shown and/or described herein).

In some implementations, different illumination characteristics (e.g., duration, intensity, wavelength, pulsing, and/or others) may be implemented for different illumination components 610 for processing the photopolymer gasket rim 702. Utilizing different illumination characteristics for different illumination components may cause different attributes (e.g., rigidity and/or elasticity/deformability characteristics) to exist in different regions of a custom gasket rim formed from the photopolymer gasket rim 702. Differences in illumination characteristics for different illumination components 610 are conceptually depicted in FIG. 7 by different lengths in the dashed lines extending outward from the illumination components of the device 600.

As noted above, the support members 602 of the support structure 606 that support the photopolymer gasket rim 702 may divide the support structure 606 into different regions 608, and the different regions 608 may be associated with different illumination components 610. In some instances, the support members 602 (e.g., support walls) may operate to block light from adjacent illumination components 610 of adjacent regions 608, thereby mitigating cross-illumination and enabling different regions 608 of the photopolymer gasket rim 702 to be illuminated/cured with different illumination characteristics to achieve different material characteristics after illumination/curing.

For instance, FIG. 7 depicts a first region 702A and a second region 702B of the photopolymer gasket rim 702, which are adjacent to one another. The first region 702A of the photopolymer gasket rim 702 is aligned with a first region 608A of the support structure 606. Similarly, the second region 702B of the photopolymer gasket rim 702 is aligned with a second region 608B of the support structure 606. During illumination, an illumination component 610A associated with the first region 608A illuminates the first region 702A of the photopolymer gasket rim 702 using first illumination characteristics. Similarly, an illumination component 610B associated with the second region 608B illuminates the second region 702B of the photopolymer gasket rim 702 using second illumination characteristics (which are different from the first illumination characteristics, as indicated in FIG. 7 by the differences in the dashed lines extending outward from the illumination components 610A and 610B). The differences in the illumination characteristics implemented by the first illumination component 610A and the second illumination component 610B may result in different material characteristics (e.g., different rigidity characteristics) for the first region 702A and the second region 702B of the photopolymer gasket rim 702.

As noted above, the support member(s) 602 that form the first region 608A and the second region 608B may at least partially mitigate the influence of light from the first illumination component 610A on the second region 702B of the photopolymer gasket rim 702. Similarly, the support member(s) 602 that form the first region 608A and the second region 608B may at least partially mitigate the influence of light from the second illumination component 610B on the first region 702A of the photopolymer gasket rim 702.

In some implementations, the illumination characteristics implemented by the various illumination components of the device 600 are selected based upon face scan data (e.g., face scan data 510). As noted above, face scan data may capture information associated with displacement of user facial features. Such displacement may be utilized to select rigidity characteristics (and/or illumination characteristics for achieving such rigidity characteristics) for a custom gasket rim. As discussed above, such rigidity characteristics (and/or illumination characteristics for achieving such rigidity characteristics) may be different for different regions or portions of a custom gasket rim (formed from a photopolymer gasket rim 702). Users may thus benefit from increased flexibility on portions of custom gasket rims that abut user face portions with greater displacement (e.g., for different facial expressions).

Figure 8:
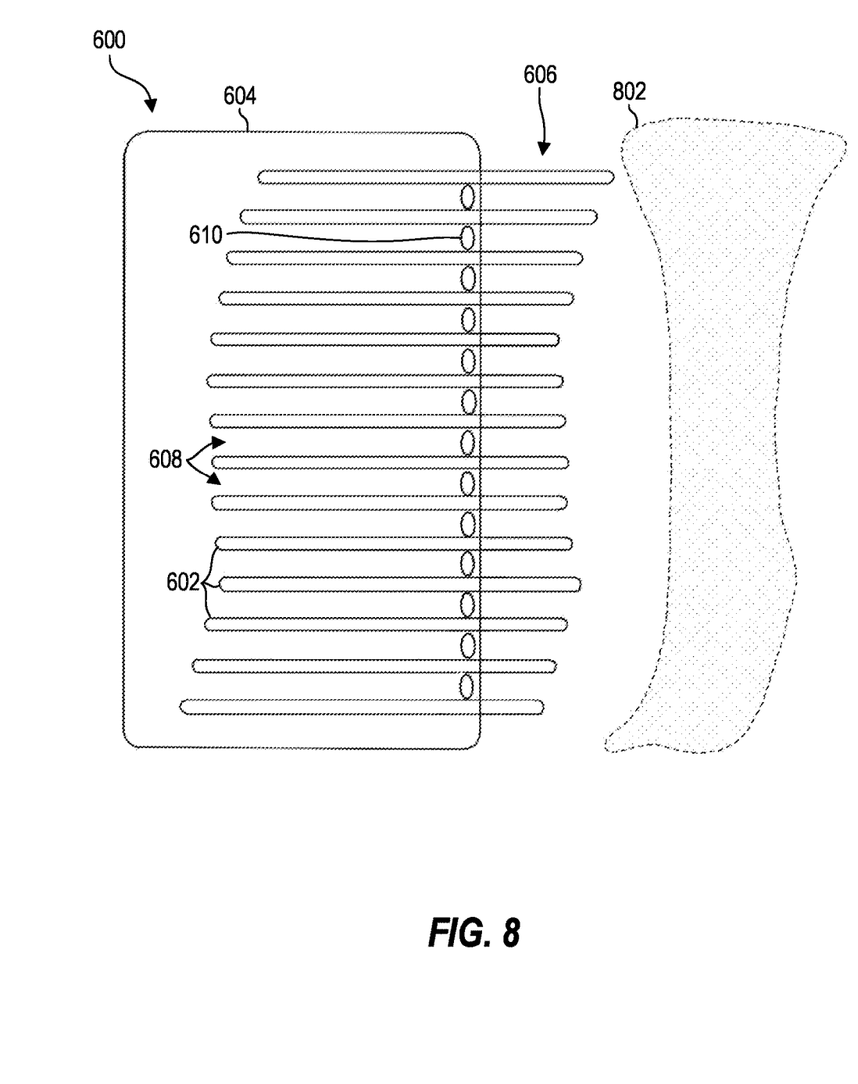

FIG. 8 depicts a completed custom gasket rim 802 formed via illumination of the photopolymer gasket rim 702 of FIG. 7. FIG. 8 illustrates the custom gasket rim 802 being removed from the support structure 606 of the device 600. In some instances, a connection interface and/or other components are then affixed to the custom gasket rim 802 to enable selective connectivity of the custom gasket rim 802 to a base gasket of a head mounted device.

Figure 9:
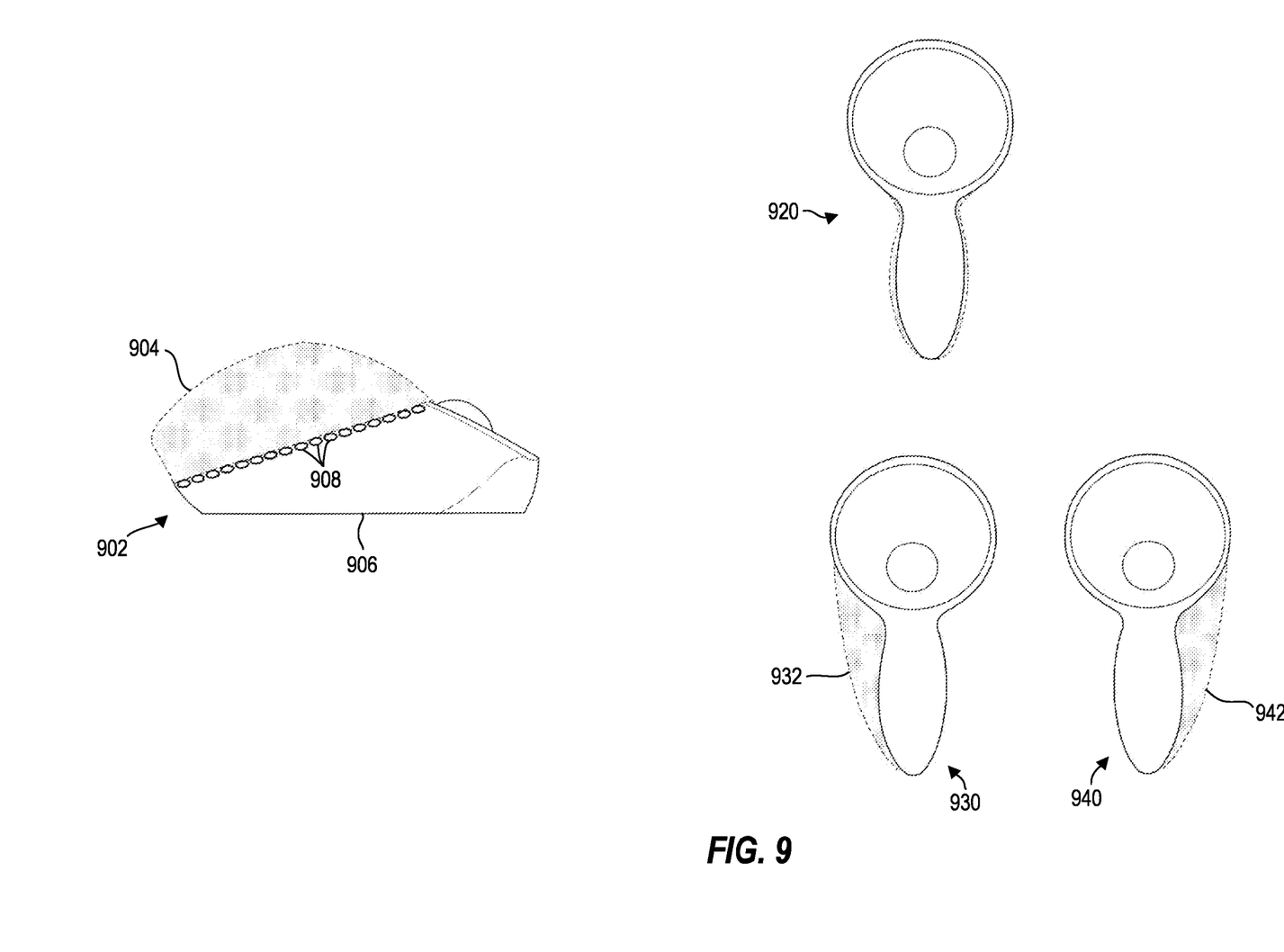
FIG. 9 illustrates a conceptual representation of custom components formed for handheld user devices.

Although many of the examples discussed herein have focused, in at least some respects, on forming custom gasket rims for head mounted devices, at least some of the principles described herein related to the formation of custom gasket rims may be applied in other contexts. For instance, FIG. 9 depicts a computer mouse 902 that includes a photopolymer support 904. The photopolymer support 904 may be formed by extending a support structure outward from the mouse body 906 to conform to a user hand shape (e.g., based on hand scan data and/or positioning of a physical user hand about the mouse body 906). A photopolymer material may then be placed over the support structure and illuminated (e.g., via illumination components 908 of the computer mouse 902, where different illumination characteristics may be applied by different illumination components 908) to provide the photopolymer support 904 that is customized for one or more particular users.

As another example, FIG. 9 depicts a bimanual VR controller 920, which may be formed into a left-handed VR controller 930 with a left-handed photopolymer support 932, or, alternatively, into a right-handed VR controller 940 with a right-handed photopolymer support 942. The left-handed VR controller 930 may be formed by extending a left-handed support structure leftward from the bimanual VR controller 920 to conform to a user hand shape (e.g., based on hand scan data and/or positioning of a physical user hand about the bimanual VR controller 920). A photopolymer material may then be placed over the left-handed support structure and illuminated to provide the left-handed photopolymer support 932 that is customized for one or more particular users. Similarly, the right-handed VR controller 940 may be formed by extending a right-handed support structure rightward from the bimanual VR controller 920 to conform to a user hand shape (e.g., based on hand scan data and/or positioning of a physical user hand about the bimanual VR controller 920). A photopolymer material may then be placed over the right-handed support structure and illuminated to provide the right-handed photopolymer support 942 that is customized for one or more particular users. These principles may be applied to form any type of photopolymer user device component (e.g., with different rigidity characteristics), in accordance with implementations of the present disclosure.

Although many of the examples discussed herein focus, in at least some respects, on utilizing photopolymer materials, other types of shapeable and/or curable materials may be utilized in accordance with the present disclosure.

Example Method(s)

The following discussion now refers to a number of methods and method acts that may be performed in accordance with the present disclosure. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 10:
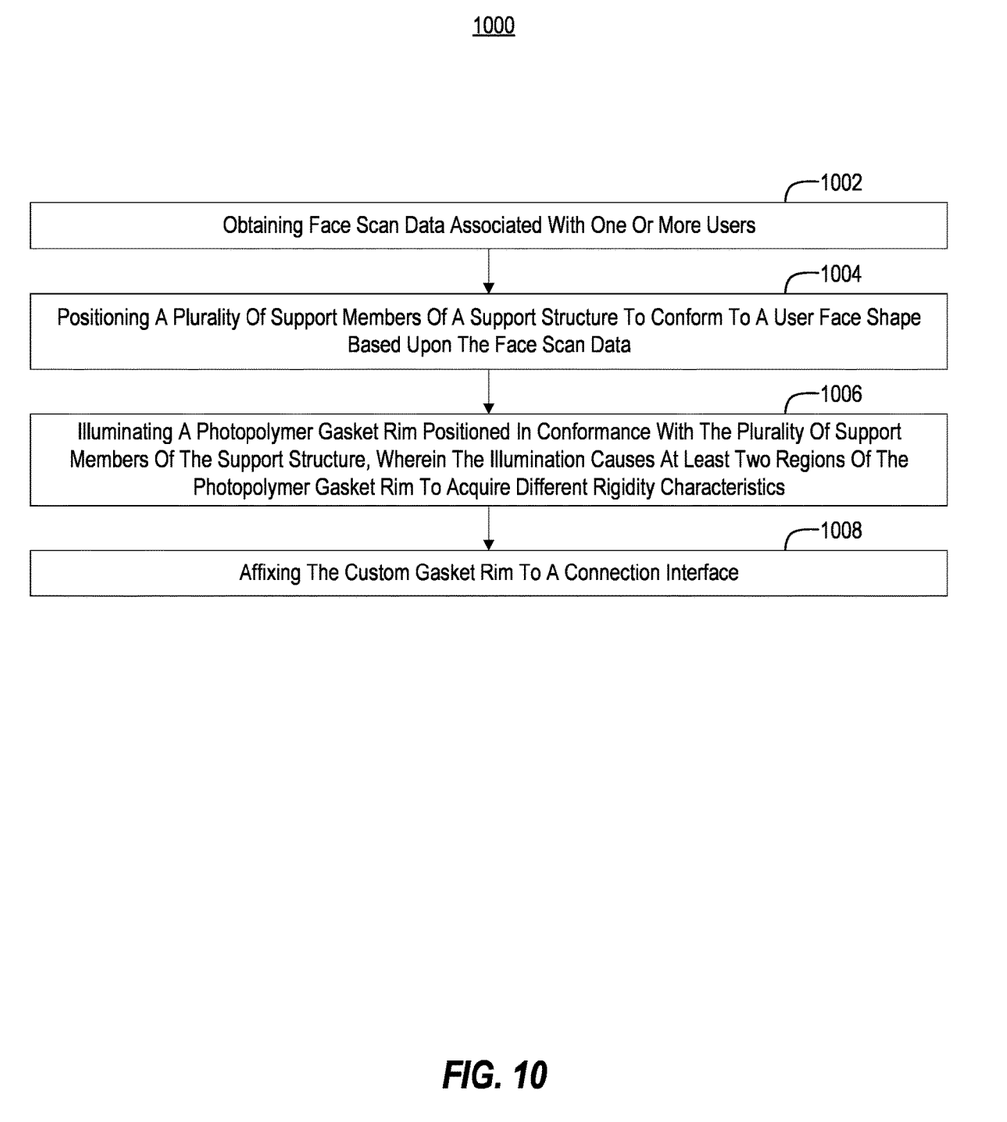
FIG. 10 illustrates an example flow diagram depicting acts associated with forming a custom gasket rim.

FIG. 10 illustrates an example flow diagram 1000 depicting acts associated with forming a custom gasket rim.

Act 1002 of flow diagram 1000 of FIG. 10 includes obtaining face scan data associated with one or more users. In some instances, the face scan data captures displacement of one or more facial features of the one or more users.

Act 1004 of flow diagram 1000 includes positioning a plurality of support members of a support structure to conform to a user face shape based upon the face scan data. In some implementations, the plurality of support members divides the support structure into a plurality of regions. Each region of the plurality of regions of the support structure may be associated with a respective illumination component (e.g., for facilitating illumination of a photopolymer gasket rim positioned in conformance with the support members of the support structure (see act 1006)).

Act 1006 of flow diagram 1000 includes illuminating a photopolymer gasket rim positioned in conformance with the support members of the support structure, wherein the illumination causes at least two regions of the photopolymer gasket rim to acquire different rigidity characteristics. In some instances, during illumination of the photopolymer gasket rim, a first region of the at least two regions of the photopolymer gasket rim is aligned with a first region of the plurality of regions of the support structure, and a second region of the at least two regions of the photopolymer gasket rim is aligned with a second region of the plurality of regions of the support structure. In some implementations, illuminating the photopolymer gasket rim includes (i) illuminating the first region of the at least two regions of the photopolymer gasket rim with the respective illumination component of the first region of the plurality of regions of the support structure and in accordance with first illumination characteristics, and (ii) illuminating the second region of the at least two regions of the photopolymer gasket rim with the respective illumination component of the second region of the plurality of regions of the support structure and in accordance with second illumination characteristics. The second illumination characteristics may be different from the first illumination characteristics to cause the different rigidity characteristics for the first region and the second region of the at least two regions of the photopolymer gasket rim. In some instances, the first illumination characteristics or the second illumination characteristics are selected based upon displacement (e.g., represented in the face scan data of act 1002).

Act 1008 of flow diagram 1000 includes affixing the custom gasket rim to a connection interface. In some instances, the connection interface enables the custom gasket rim to selectively connect to and disconnect from a base gasket connected to a head mounted device chassis of a head mounted device.

Figure 11:
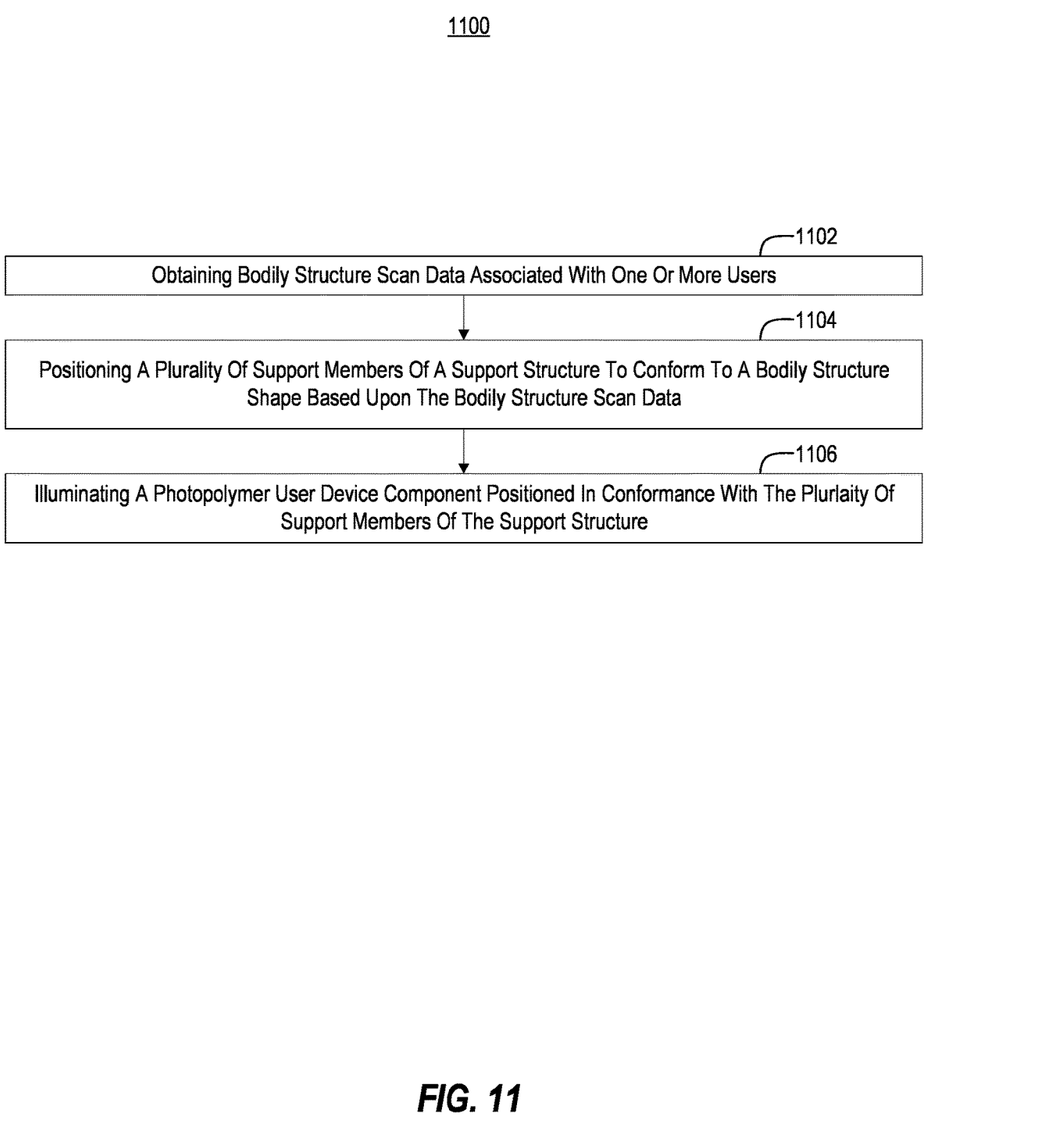
FIG. 11 illustrates an example flow diagram depicting acts associated with forming a custom user device component.

FIG. 11 illustrates an example flow diagram 1100 depicting acts associated with forming a custom user device component.

Act 1102 of flow diagram 1100 of FIG. 11 includes obtaining bodily structure scan data associated with one or more users.

Act 1104 of flow diagram 1100 includes positioning a plurality of support members of a support structure to conform to a bodily structure shape based upon the bodily structure scan data.

Act 1106 of flow diagram 1100 includes illuminating a photopolymer user device component positioned in conformance with the support members of the support structure. In some implementations, the illumination causes at least two regions of the photopolymer user device component to acquire different rigidity characteristics.

ADDITIONAL DETAILS RELATED TO THE DISCLOSED EMBODIMENTS

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

As used herein, the term "about", when used to modify a numerical value or range, refers to any value within 5%, 10%, 15%, 20%, or 25% of the numerical value modified by the term "about".

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

We claim:

1. A head mounted device, comprising:
   a base gasket connected to a head mounted device chassis; and
   a custom gasket rim that is selectively connectable to and disconnectable from the base gasket, the custom gasket rim being configured to intervene between the base gasket and a face of a user, wherein the custom gasket rim is customized in size and shape based upon one or more face scans of one or more individual users, and wherein the one or more face scans measure displacement of facial features in association with different facial expressions of the one or more individual users.

2. The head mounted device of claim 1, wherein the custom gasket rim is customized in size and shape to fit an individual user or a population of users.

3. The head mounted device of claim 2, wherein the custom gasket rim is customized in rigidity based upon the one or more face scans of one or more individual users.

4. The head mounted device of claim 3, wherein the custom gasket rim comprises at least two regions with different rigidity characteristics.

5. The head mounted device of claim 4, wherein the custom gasket rim comprises a photopolymer material.

6. The head mounted device of claim 1, further comprising a sensor array configured to interface with the base gasket or the custom gasket rim, the sensor array being configured to detect signals emitted by one or more transmitters positioned on the head mounted device to facilitate face tracking.

7. The head mounted device of claim 6, wherein the head mounted device comprises one or more image-based face tracking systems.

8. The head mounted device of claim 7, wherein the head mounted device is configured to utilize first face tracking output obtained using the sensor array in combination with second face tracking output obtained using the one or more image-based face tracking systems to facilitate face tracking.

9. The head mounted device of claim 6, wherein the sensor array comprises a radiofrequency (RF) antenna array configured to detect radio signals emitted by the one or more transmitters positioned on the head mounted device to facilitate face tracking.

10. The head mounted device of claim 6, wherein the sensor array is selectively connectable to and disconnectable from the base gasket.

11. The head mounted device of claim 6, wherein the sensor array is selectively connectable to and disconnectable from the custom gasket rim.

12. The head mounted device of claim 6, wherein the sensor array is configured to intervene between the base gasket and the custom gasket rim.

13. The head mounted device of claim 6, wherein the sensor array is customized in size and shape to fit an individual user or a population of users.

14. A method for forming a custom gasket rim, comprising:
   obtaining face scan data associated with one or more users;
   positioning a plurality of support members of a support structure to conform to a user face shape based upon the face scan data; and
   illuminating a photopolymer gasket rim positioned in conformance with the plurality of support members of the support structure, wherein the illumination causes at least two regions of the photopolymer gasket rim to acquire different rigidity characteristics.

15. The method of claim 14, wherein the plurality of support members divides the support structure into a plurality of regions, and wherein each region of the plurality of regions of the support structure is associated with a respective illumination component for facilitating illumination of the photopolymer gasket rim positioned in conformance with the plurality of support members of the support structure.

16. The method of claim 15, wherein:
during illumination of the photopolymer gasket rim, a first region of the at least two regions of the photopolymer gasket rim is aligned with a first region of the plurality of regions of the support structure, and a second region of the at least two regions of the photopolymer gasket rim is aligned with a second region of the plurality of regions of the support structure, and
illuminating the photopolymer gasket rim comprises:
illuminating the first region of the at least two regions of the photopolymer gasket rim with the respective illumination component of the first region of the plurality of regions of the support structure and in accordance with first illumination characteristics; and
illuminating the second region of the at least two regions of the photopolymer gasket rim with the respective illumination component of the second region of the plurality of regions of the support structure and in accordance with second illumination characteristics, the second illumination characteristics being different from the first illumination characteristics to cause the different rigidity characteristics for the first region and the second region of the at least two regions of the photopolymer gasket rim.

17. The method of claim 16, wherein the face scan data captures displacement of one or more facial features of the one or more users, and wherein the first illumination characteristics or the second illumination characteristics are selected based upon the displacement.

18. The method of claim 14, further comprising:
affixing the custom gasket rim to a connection interface, the connection interface enabling the custom gasket rim to selectively connect to and disconnect from a base gasket connected to a head mounted device chassis of a head mounted device.

19. A method for forming a custom user device component, comprising:
obtaining bodily structure scan data associated with one or more users;
positioning a plurality of support members of a support structure to conform to a bodily structure shape based upon the bodily structure scan data; and
illuminating a photopolymer user device component positioned in conformance with the plurality of support members of the support structure, wherein the illumination causes at least two regions of the photopolymer user device component to acquire different rigidity characteristics.

* * * * *